(12) United States Patent
Kawamura (10) Patent No.: US 6,330,258 B1
(45) Date of Patent: Dec. 11, 2001

(54) LASER APPARATUS

(75) Inventor: Kouji Kawamura, Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 0 days.

(21) Appl. No.: 09/466,723

(22) Filed: Dec. 17, 1999

(30) Foreign Application Priority Data

Jan. 12, 1999 (JP) .................................................. 11-005029

(51) Int. Cl.⁷ .................................. H01S 3/13; H01S 3/00
(52) U.S. Cl. ................... 372/30; 372/29.01; 372/29.011; 372/29.012; 372/29.015; 372/38.01; 372/38.04
(58) Field of Search ................................... 372/30, 29.01, 372/29.011, 29.012, 29.015, 38.01, 38.04, 81

(56) References Cited

U.S. PATENT DOCUMENTS

| | | | |
|---|---|---|---|
| 4,829,530 | * | 5/1989 | Sato et al. ................................. 372/9 |
| 5,017,834 | * | 5/1991 | Farnsworth ............................. 315/58 |
| 5,191,261 | * | 3/1993 | Mass ..................................... 315/171 |
| 5,692,004 | * | 11/1997 | Greene ................................... 372/69 |

* cited by examiner

Primary Examiner—Teresa M. Arroyo
Assistant Examiner—James Menefee
(74) Attorney, Agent, or Firm—Wenderoth, Lind & Ponack, L.L.P.

(57) ABSTRACT

A simmer circuit 18 comprises a power supply unit 54 for the supply of a simmer current $I_s$ to an excitation lamp 22 and a control unit 56 for the control of the current value of the simmer current $I_s$. In the control unit 56, a current detection signal $V_s$ from a current sensor, e.g., a Hall CT 70 attached to the power supply unit 54 is fed via a buffer amplifier 72 for impedance conversion to a non-inversion input terminal of an operational amplifier 82 for signal amplification. The amplification factor $\mu$ of the operational amplifier 82 differs depending on which one is selected from three switches 84, 86 and 88. A CPU 38 selects the switch 84 when switching the simmer current $I_s$ to 0.3 A for "low speed zone", selects the switch 86 when switching to 2 A for "medium speed zone" and switches 88 when switching to 5 A for "high speed zone". A current control circuit 100 provides an on/off control of the simmer current $I_s$ on the basis of a control signal from the CPU 38, and, during on period, compares a current detection signal $\mu V_s$ from the operational amplifier 82 with a reference current value KI from a reference current value setting unit 102 to provide a simmer current control so as to nullify the comparison error.

14 Claims, 9 Drawing Sheets

LASER APPARATUS

BACKGROUND OF THE INVENTION

1. Field of the Invention

The present invention relates generally to a laser apparatus, and more particularly to a solid-state laser apparatus using a lamp as laser excitation means, for providing iterative oscillatory outputs of pulsed laser beams.

2. Description of the Related Art

This type of solid-state laser apparatus typically allows a minute standby discharge current, a so-called simmer current, to flow through the excitation lamp during the standby periods (not oscillating laser) for the purpose of achieving an improved start of lighting of the excitation lamp upon the laser oscillation. The simmer current forms a discharge path within the excitation lamp despite the standby periods, so that an intrinsic lamp current for the lamp lighting (laser oscillation) can readily flow therethrough from the main laser power supply, making high-speed iterative pulse oscillations feasible.

As a result of investigations effected by the inventor, it has proved that upon the iterative oscillatory outputs of the pulsed laser beams, the simmer current may affect both the service life of the excitation lamp and the stability in the laser output. That is, it has turned out that a larger simmer current gives the excitation lamp a shorter service life, whereas a smaller simmer current renders the laser output more unstable upon the high-speed iterations.

Such a conventional solid-state laser apparatus has however employed the simmer current having a fixed current value irrespective of the repetition rate of the pulse oscillations. For this reason, there arose problems on occasions that the excitation lamp may become consumed at a relatively early stage even in the case of low pulse repetition rate operations at all times or of low ordinary operation rate or that the laser output may become unstable upon an increase in the pulse repetition rate.

SUMMARY OF THE INVENTION

The present invention was conceived in view of the above problems. It is therefore the object of the present invention to provide a laser apparatus designed to extend the service life of its excitation lamp as far as possible and to improve the stability in its laser output, through the proper control of the current value of the simmer current.

In order to attain the above object, according to a first aspect of the present invention there is provided a laser apparatus having an excitation lamp through which a simmer current flows during the standby period and into which a pulsed lamp current is fed upon the laser oscillation to cause a pulse lighting of the excitation lamp, whose optical energy excites a solid-state laser medium to provide an oscillatory output of pulsed laser beams, the apparatus comprising means for variably controlling the current value of the simmer current in conformity with the repetition rate or the pulse separation of the pulsed laser beams.

According to a second aspect of the present invention there is provided a laser apparatus having an excitation lamp through which a simmer current flows during the standby period and into which a pulsed lamp current is fed upon the laser oscillation to cause a pulse lighting of the excitation lamp, whose optical energy excites a solid-state laser medium to provide an oscillatory output of pulsed laser beams, the apparatus comprising zone setting means for setting a plurality of zones of the repetition rate or the pulse separation of the pulsed laser beams; simmer current setting means for separately setting the current value of the simmer current for each of the plurality of zones; zone judgment means for judging zones associated with the pulsed laser beams output in an oscillatory manner; and simmer current control means for controlling the simmer current to have current values corresponding to associated zones judged by the zone judgment means.

The zone judgment means may include means for judging the associated zones on the basis of a sequence previously defined for the oscillatory output of the pulsed laser beams.

Alternatively, the zone judgment means may include measurement means for measuring the repetition rate or the pulse separation of the pulsed laser beams oscillatorily output in response to predetermined external signals issued at any arbitrary timings; and means for judging the associated zones on the basis of measured values acquired by the measurement means.

The simmer current control means preferably comprise a simmer power supply circuit including a switching element, for the supply of the simmer current to the excitation lamp; simmer current detection means for detecting the simmer current to issue a voltage signal indicative of the current value thereof; an amplifier capable of selecting any one of a plurality of amplification factors defined in a corresponding manner for each of the plurality of zones, the amplifier amplifying the voltage signal from the current detection means with selected one of the amplification factors; amplification factor switching means for switching the amplifier to have the amplification factor corresponding to an associated zone judged by the zone judgment means; and pulse width control means for comparing an output signal from the amplifier with a previously defined reference current value and for providing a switching control of the switching element by use of switching pulses of a certain frequency having such a pulse width as to allow the comparison error to approach zero.

According to the laser apparatus of the present invention, as set forth hereinabove, it is possible to ensure as long a service life of the excitation lamp as possible and to achieve an improved stability of the laser output by providing a variable control of the current values of the simmer current in conformity with the pulse repetition rate of the pulsed laser beams.

BRIEF DESCRIPTION OF THE DRAWINGS

The above and other objects, aspects, features and advantages of the present invention will become more apparent from the following detailed description when read in conjunction with the accompanying drawings, in which.

DESCRIPTION OF THE PREFERRED EMBODIMENTS

The present invention will now he described with reference to the accompanying drawings which illustrate presently preferred embodiments thereof in a non-limitative manner.

Figure 1:
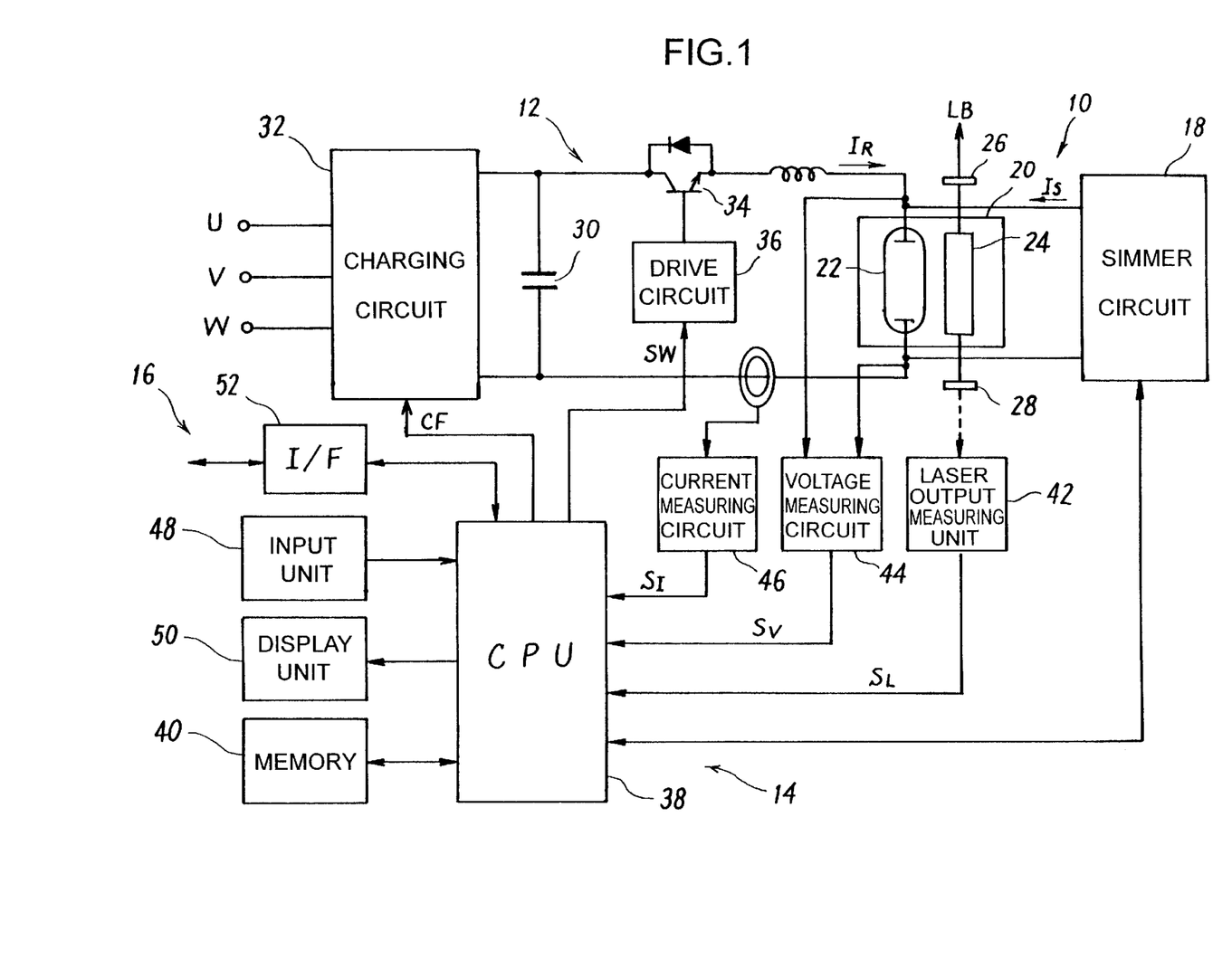
FIG. 1 is a block diagram showing the entire configuration of major parts of a YAG laser beam processing apparatus in accordance with an embodiment of the present invention.

FIG. 1 depicts an overall major configuration of a YAG laser beam processing apparatus in accordance with an embodiment of the present invention. The YAG laser beam processing apparatus comprises principally a laser oscillation unit 10, a laser power supply unit 12, a control unit 14, an input/output interface unit 16 and a simmer circuit 18.

The laser oscillation unit 10 includes an excitation lamp 22 and a YAG rod 24 which are juxtaposed in proximity to each other inside a chamber 20, as well as a pair of optical resonator mirrors 26 and 28 arranged on the optical axis of the YAG rod 24 outside the chamber 20.

The excitation lamp 22 is supplied with a lamp current $I_R$ having a pulse waveform from the laser power supply unit 12 for pulse lighting. When the excitation lamp 22 lights in a pulsed manner, its optical energy excites the YAG rod 24, allowing a beam of light emerging from both ends of the YAG rod 24 onto the optical axis to be iteratively reflected between the optical resonator mirrors 26 and 28 for amplification and thereafter exit the output mirror 26 in the form of a pulsed laser beam LB. After leaving the output mirror 26, the pulsed laser beam LB is delivered via an appropriate laser transmission system not shown to a laser processing site not shown for irradiation onto a workpiece not shown.

The laser power supply unit 12 includes a capacitor 30 for storing electric power for laser oscillation to be supplied to the laser oscillation unit 10, a charging circuit 32 for converting a commercial alternating current, e.g., three-phase AC power supply voltage (U, V, W) into a direct current to charge the capacitor 30 to a predetermined DC voltage, a transistor 34 acting as a switching element connected between the capacitor 30 and the excitation lamp 22 of the laser oscillation unit 10, and a drive circuit 36 for switching the transistor 34 at a high frequency (e.g., 20 kHz).

The control unit 14 includes a CPU (microprocessor) 38 for providing a control of operations of the entire apparatus and the parts, a memory 40 for storing various programs, various set values or computation data for causing the CPU 38 to execute predetermined processing, and various measuring means 42 to 46 for measuring laser output of the pulsed laser beam LB or corresponding thereto electrical parameters within the laser power supply unit 12.

For the power supply unit 12, the CPU 38 imparts a charge control signal CF for charging the capacitor 30 at a set voltage to the charging circuit 32 and imparts a switching control signal SW for waveform control to the drive circuit 36.

For the purpose of waveform control, the CPU 38 compares with a predefined reference waveform for waveform control a laser output measured value $S_L$ from a laser output measuring unit 42, a lamp voltage measured value $S_V$ from a voltage measuring circuit 44 or a lamp current measured value $S_I$ from a current measuring circuit 46, or a lamp power measured value $S_P$ ($S_V \cdot S_I$) obtained from the lamp voltage measured value $S_V$ and the lamp current measured value $S_I$, to thereby find a comparison error, and generates as the switching control signal $S_W$ a pulse width control signal with a pulse width allowing the comparison error to approach zero.

Such a feedback control system provides a control so as to allow the laser output of the pulsed laser beam LB oscillatorily output from the laser oscillation unit 10 or the corresponding thereto electrical parameters (lamp current, lamp power, lamp voltage) within the laser power supply unit 12 to follow the respective reference waveforms for waveform control.

It is to be appreciated that the above-described pulse width control function in the CPU 38 may be implemented by a separate CPU or by a dedicated control circuit.

The input/output interface unit 16 includes an input unit 48, a display unit 50 and a communication interface circuit (I/F) 52. The input unit 48 has a keyboard and a mouse for example, and is used for the entry of set values of various conditions or parameters in compliance with a given laser processing. In this embodiment, various set values related to the simmer circuit 18 may also be entered through the input unit 48. The display unit 50 is comprised for example of an LCD or an LED for the display of set values, measured values, judgment values or the like. The I/F 52 is used to interchange signals or data with an external device not shown such as a conveyance robot for laser processing or a controller.

The simmer circuit 18 serves to supply a simmer current $I_s$ for pre-discharge to the excitation lamp 22 in the standby mode during which no laser oscillation occurs with the apparatus turned on. In this embodiment, the simmer circuit 18 is so configured as to be able to provide an appropriate alteration (switching) of the current value of the simmer current $I_s$ in response to the state of the laser oscillation unit 10 or the laser power supply unit 12 under the control of the CPU 38.

Figure 2:
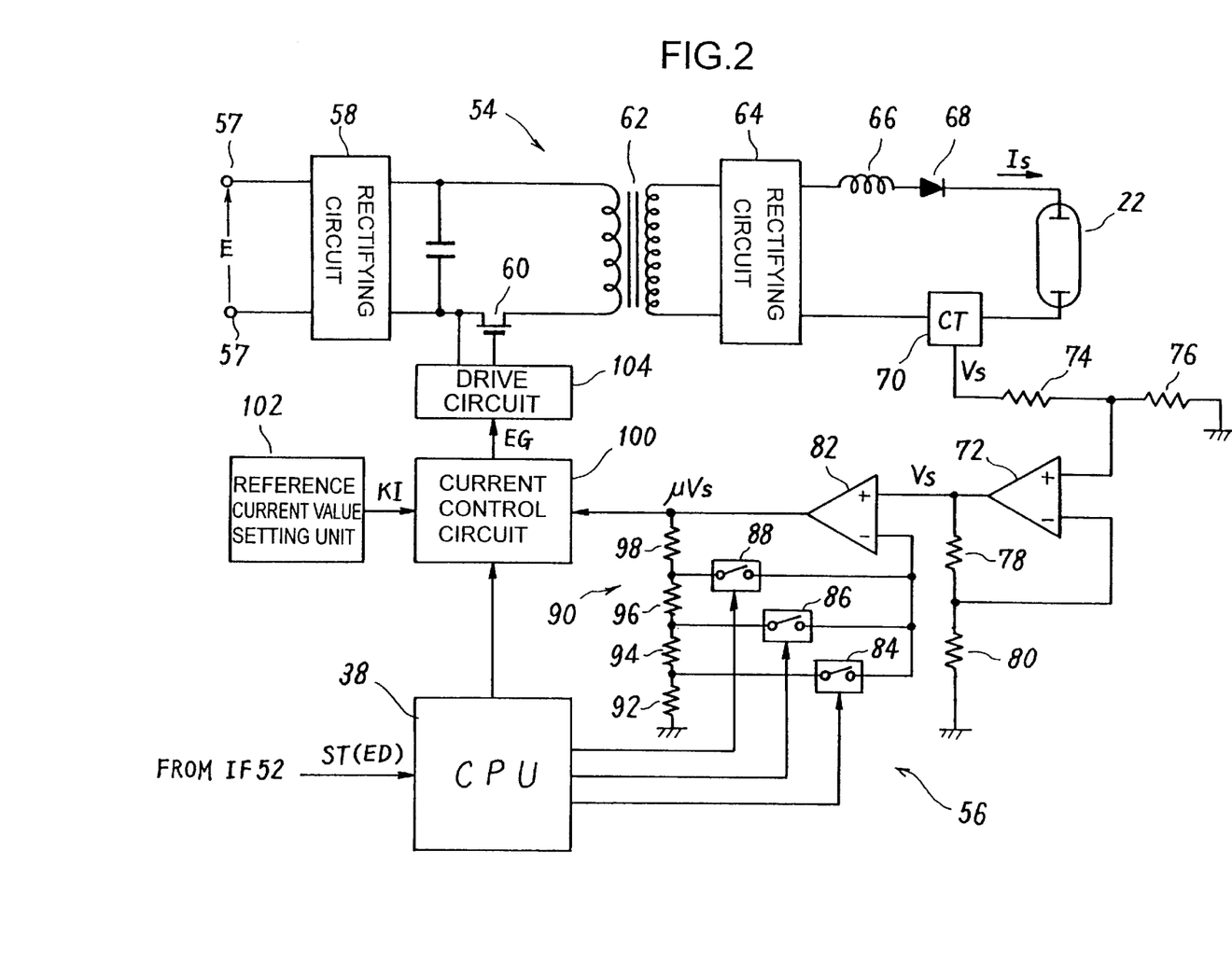
FIG. 2 is a block diagram showing the circuit configuration of a simmer circuit of the embodiment.

FIG. 2 depicts a circuit configuration of the simmer circuit 18 of this embodiment. This simmer circuit 18 comprises a power supply unit 54 for the supply of a simmer current $I_s$ to the excitation lamp 22 and a control unit 56 for the control of the current value of the simmer current $I_s$.

The power supply unit 54 includes a rectifying circuit 58 by means of which a commercial AC voltage E at, e.g., 200 volts fed to an input terminal 57 is converted into a direct current at a predetermined voltage. The output terminal of the rectifying circuit 58 is connected via a switching element 60 in the form of, e.g., an FET (field effect transistor) to the primary coil of a step-up transformer 62. The switching element 60 turns on/off at a frequency of, e.g., 50 kHz under the switching control of the control unit 56 which will be described later. This allows a pulse current of the same frequency to flow through the primary circuit of the step-up transformer 62 so that electromagnetic induction gives rise to a secondary voltage of AC having a similar pulse waveform through the secondary coil. The AC secondary voltage is converted by the rectifying circuit 64 into a direct current at a predetermined voltage so that the DC voltage from the rectifying circuit 64 is applied to the excitation lamp 22 by way of a choke coil 66 and a diode 68 for reverse-current prevention, allowing a flow of a DC simmer current $I_s$ through the closed circuit.

In the control unit 56, a current sensor in the form of, e.g., a Hall CT 70 attached to the power supply unit 54 detects the simmer current $I_s$ flowing through the excitation lamp 22 and issues a voltage signal (current detection signal) $V_s$ indicative of the current value.

The current detection signal $V_s$ from the Hall CT 70 is fed to a non-inversion input terminal of an operational amplifier 82 for signal amplification by way of a buffer amplifier for impedance conversion consisting of an operational amplifier 72 and its peripheral (input/feedback) resistors 74 to 80.

An inversion input terminal of the operational amplifier 82 is electrically connected to connection points of a series resistance circuit 90 by way of a plurality of (three in this example) analog switches 84, 86 and 88 which are arranged in parallel. More specifically, the series resistance circuit 90 consists of four resistors 92, 94, 96 and 98 which are connected in series between an output terminal of the operational amplifier 82 and a ground terminal, with the switch 84 being connected to the connection point between the resistors 92 and 94, the switch 86 connected to the connection point between the resistors 94 and 96, and the switch 88 connected to the connection point between the resistors 96 and 98.

Only one of the three switches 84, 86 and 88 is selectively allowed to come on, with the other switches remaining off, under the control of the CPU 38.

If the switch 84 is selected, then the resistor 92 constitutes an input resistor for the operational amplifier 82 whilst the resistors 94, 96 and 98 constitute feedback resistors for the same. Let R92, R94, R96 and R98 be the resistance values of the resistors 92, 94, 96 and 98, respectively, then the amplification factor $\mu 1$ of the operational amplifier 82 in this case is given as (R92+R94+R96+R98)/R92.

If the switch 86 is selected, then the resistors 92 and 94 constitute the input resistors whilst the resistors 96 and 98 constitute the feedback resistors. The amplification factor $\mu 2$ of the operational amplifier 82 in this case is given as (R92+R94+R96+R98)/(R92+R94).

If the switch 88 is selected, the resistors 92, 94 and 96 constitute the input resistors whilst the resistor 98 constitutes the feedback resistor. The amplification factor $\mu 3$ of the operational amplifier in this case is given as (R92+R94+R96+R98)/(R92+R94+R96).

In this manner, different amplification factors $\mu$ are given to the operational amplifier 82 depending on one selected from the three switches 84, 86 and 88. Selection of the switch 84 results in the greatest amplification factor $\mu 1$, selection of the switch 86 results in the second greatest amplification factor $\mu 2$, and selection of the switch 88 results in the smallest amplification factor $\mu 3$.

In order to render the current values of the simmer current $I_s$ switchable in the multi-stage, this embodiment confers a multi-stage (three-stage in this example) switchable amplification factors $\mu$ on the operational amplifier 82.

As can be seen in TABLE 1 showing the relationship between the pulse repetition rate definition zones and the simmer current set values corresponding thereto, this embodiment separates the rate with which the pulsed laser beam LB is iteratively output in an oscillatory manner (pulse oscillation repetition rate) f into three zones, i.e., "low speed zone" (f<2 pps), "medium speed zone" (2 pps≦f≦200 pps) and "high speed zone" (200 pps<f), with the "low speed zone", "medium speed zone" and "high speed zone" being given simmer current set values of 0.3 A, 2 A and 5 A, respectively. These set values are entered as data through the input unit 48 into the CPU 38 and are stored in a predetermined storage area within the memory 40.

TABLE 1

| ZONES OF PULSE REPETITION RATE f | SIMMER CURRENT SET VALUE |
|---|---|
| low speed zone (f < 2 pps) | 0.3A |
| medium speed zone (2 pps ≦ f ≦ 200 pps) | 2A |
| high speed zone (200 pps < f) | 5A |

The CPU 38 selects the switch 84 when switching the simmer current $I_s$ to 0.3 A for "low speed zone", selects the switch 86 upon the switching to 2 A for "medium speed zone" and selects the switch 88 upon the switching to 5 A for "high speed zone".

The three-stage amplification factors $\mu 1$, $\mu 2$ and $\mu 3$ in the operational amplifier 82 are selected to be values corresponding to the three different set values 0.3 A, 2 A and 5 A, respectively, of the simmer current. More specifically, the selection is made such that the set value multiplied by the amplification factor (0.3 $\mu 1$, 2$\mu 2$, 5 $\mu 3$) results in a constant value K at all times.

This enables a current detection signal $\mu V_s$ having a voltage level in the vicinity of a reference voltage KI corresponding to the above constant value K to appear at the output terminal of the operational amplifier 82 irrespective of the simmer current set values. A current control circuit 100 accepts the current detection signal $\mu V_s$ from the operational amplifier 82.

The current control circuit 100 provides an on/off control of the simmer current $I_s$ on the basis of a control signal from the CPU 38 and compares the current detection signal $\mu V_s$ from the operational amplifier 82 with the reference current value KI from a reference current value setting unit 102 during ON period, to thereby provide a simmer current control so as to nullifying the comparison error. In this embodiment, the current control circuit 100 is provided with a pulse generating circuit not shown which generates a reference pulse at 50 kHz for example. The circuit 100 issues as a switching control signal EG the reference pulse whose pulse width has been modulated with the comparison error. Based on the switching control signal, the circuit 100 provides the on/off control of the switching element 60 of the power supply unit 54 by way of a drive circuit 104.

Referring then to FIGS. 3 to 8, description will be made of operations of the simmer current control system effected in this embodiment.

In conformity with the laser processing requirements, the YAG laser beam processing apparatus of this embodiment selects the conditions such as the waveform of the pulsed laser beam LB, the output (beam intensity), the repetition rate and the number of pulses. Among these conditions, the ones such as the waveform and the output inherent in the pulse itself are previously set and entered into the apparatus. However, the time-related or timing-related conditions such as the repetition rate and the number of pulses may be set and entered into the apparatus in advance or alternatively may be determined by a command signal (start signal, stop signal, etc) from the external device.

In the event of issue of the command signal from the external device, employed for the oscillatory output of a series of pulsed laser beams LB is any one of three cases which follow. A first case is where the external command signal instructs the apparatus on only the start point to oscillatorily output the series of pulsed laser beams LB, after which a certain sequence previously set in the apparatus is exclusively used. A second case is where the external command signal instructs the apparatus on both the star t point and the stop point so that the sequence therebetween is entrust ed to the apparatus. A third case is where the external command gives any arbitrary instruction on the pulse oscillation timing to each individual pulsed laser beam LB.

Figure 3:
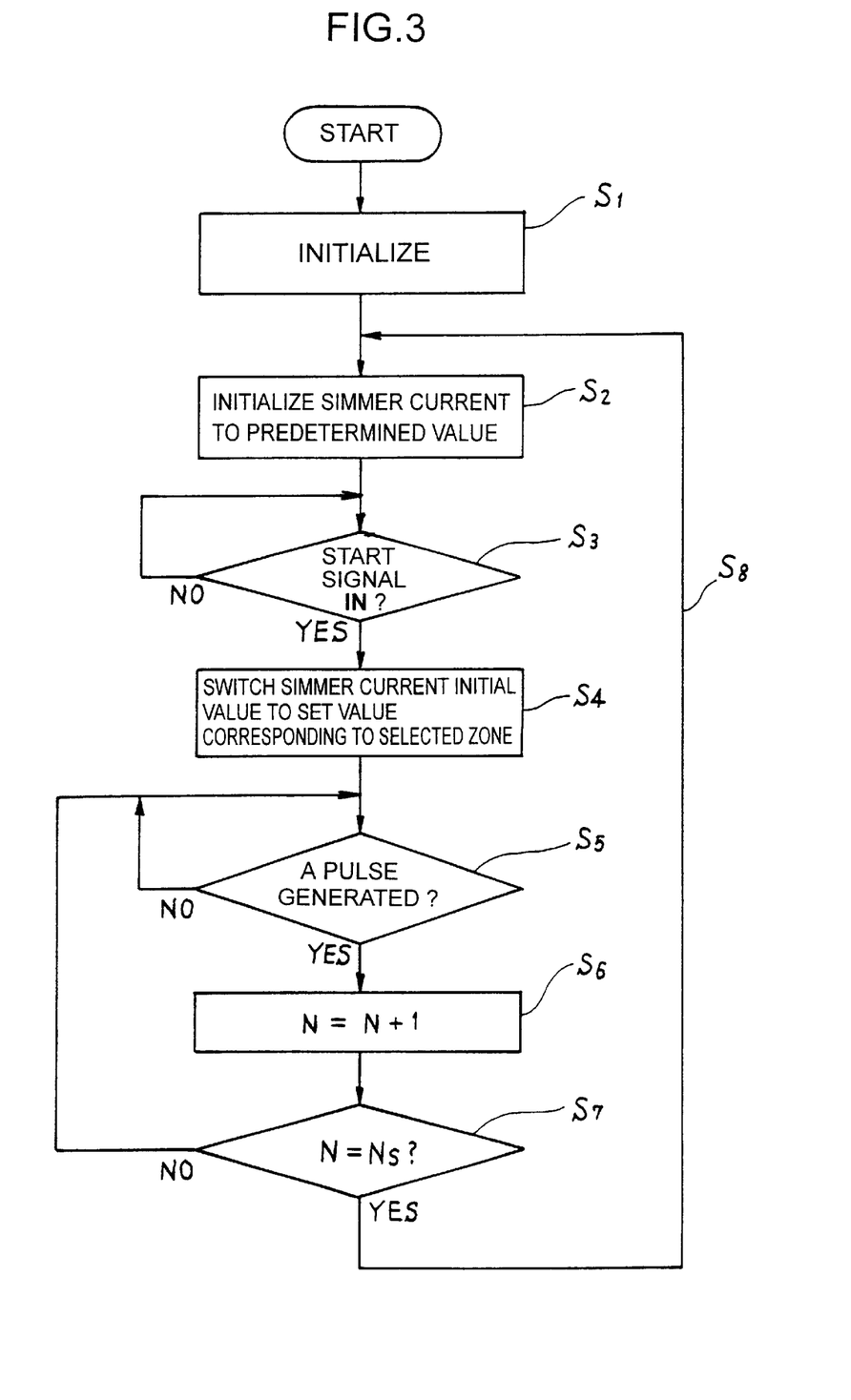
FIG. 3 is a flowchart showing the procedures of processing effected by the CPU to provide a variable control of the simmer current in the first case of the embodiment.
Figure 4:
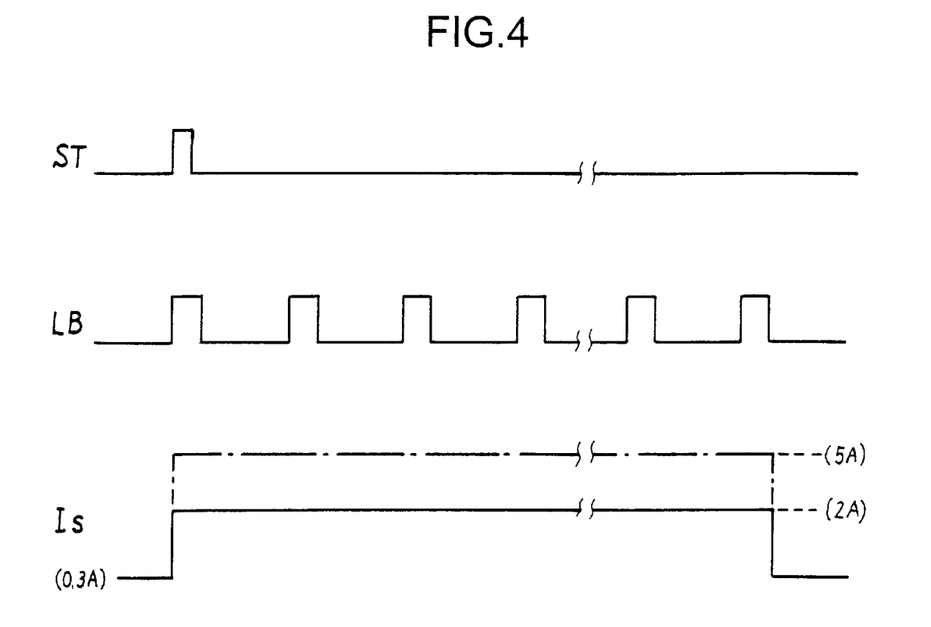
FIG. 4 is a timing chart showing diagrammatically the timing and the waveform of each part in the first case.

FIG. 3 illustrates procedures of processing effected by the CPU 38 in order to provide a variable control of the simmer current in the first case. FIG. 4 diagrammatically depicts a timing and a waveform at each part in the first case.

In the initialization (step $S_1$) effected immediately after the power-on or after a predetermined reset, the CPU 38 retrieves a desired sequence and condition set values from the memory 40 and identifies the initial value of the simmer current from the thus retrieved data. Typically, the point to issue the external start signal after the power-on or reset is uncertain and therefore extended standby period may be required, so that the simmer current initial value is selected to be the smallest current set value (0.3 A) for "low speed zone".

The CPU 38 selects the amplification factor $\mu$ of the amplifier 82 so as to ensure that the current value of the simmer current $I_s$ fed from simmer circuit 18 to the excitation lamp 22 coincides with the simmer current initial value. In this example, the switch 84 for "low speed zone" is selectively turned on (step $S_2$).

This enables a feedback constant-current control loop including the current sensor 70, the amplifier 82, the current control circuit 100, the reference current value setting unit 102 and the switching element 60 to act in the simmer circuit 18 whereby the simmer current $I_s$ is kept at the simmer current initial value (0.3 A).

When an external start signal ST is accepted through the I/F 52 (step $S_3$), the CPU 38 judges an associated zone from the set value of the pulse repetition rate f related to the sequence prepared and switches the current value of the simmer current $I_s$ to the set value corresponding to the associated zone (step $S_4$). If the pulse repetition rate f has the set value of 15 pps for example, then switching is made to the set value (2 A) for "medium speed zone". To this end, the associated switch 86 is selectively turned on for the amplifier 82.

In turn, if the set value of the pulse repetition rate f is 300 pps for example, then switching is made to the set value (5 A) for "high speed zone". To this end, the associated switch 88 is selectively turned on for the amplifier 82. Also, there may possibly be applications where the set value of the pulse repetition rate f is 1 pps for example or where a single pulsed laser beam LB is issued in an oscillatory manner. In such an event, the current value of the simmer current $I_s$ is kept at the initial value (0.3 A). The associated switch 84 is thus held on.

Within the simmer circuit 18, the simmer current $I_s$ is thereafter kept at the thus selected (switched) set value by virtue of the feedback constant-current control loop.

Under such a simmer current $I_s$, the CPU 38 provides a control of the laser power supply unit 12 in conformity with the above sequence such that the excitation lamp 22 of the laser oscillation unit 10 is fed with a lamp current $I_R$ having a predetermined pulse waveform. In the laser oscillation unit 10, the YAG rod 24 is excited every time the excitation lamp 22 is lighted in a pulse-like manner, allowing the pulsed laser beam LB having a predetermined waveform to be oscillatorily output from the output mirror 26 of the optical resonator. It is to be noted that when the excitation lamp 22 lights up in a pulse-like manner as a result of supply of the lamp current $I_R$, the simmer current $I_s$ is temporarily cut off since a lamp voltage is applied as a backward bias to the protection diode 68 in the simmer circuit 18.

In the laser processing site, the workpiece is subjected to pulsed laser beams LB condensed by an output unit, for laser processing such as welding, cutting or boring by use of laser energy of the pulsed laser beams LB.

The YAG laser beam processing apparatus of this embodiment allows the simmer current $I_s$ to form pre-discharge path in the excitation lamp 22 with an appropriate current value corresponding to the pulse repetition rate f during the dwells of the iterative pulse laser oscillations, thereby achieving stabilized iterative pulse lighting of the excitation lamp 22 and therefore stabilized iterative pulse laser oscillations of the laser oscillation unit 10, to acquire the pulsed laser beams LB having a stable output (beam intensity). This leads to an improved processing quality in the laser beam processing.

On the basis of measured value signals from the measuring means 42 to 46, the CPU 38 counts up the pulsed laser beams LB output from the laser oscillation unit 10 in an oscillatory manner (steps $S_5$, $S_6$). If the count (cumulative) value has reached a set value $N_s$ (step $S_7$) then the CPU 38 terminates the sequence at that point of time and returns the current value of the simmer current $I_s$ to its initial value (steps $S_8$, $S_2$).

In this way, the simmer current $I_s$ flows at its minimum set value during the standby or dwell periods before the start of or after the end of the series of iterated pulse laser oscillations, so that it is possible to extend the life of the excitation lamp 22 as far as possible as well as to minimize the advancing speed of consuming degradation.

Figure 5:
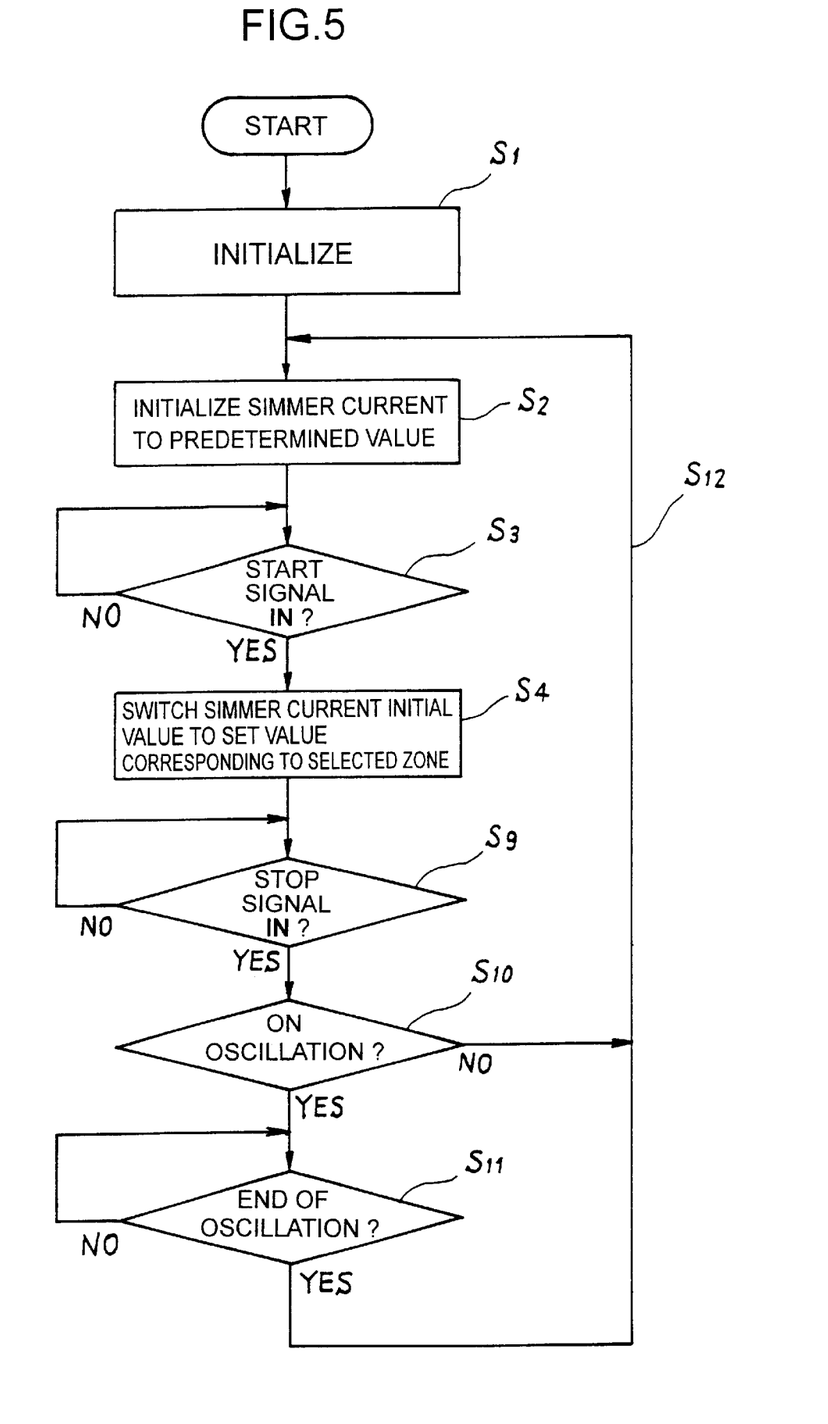
FIG. 5 is a flowchart showing the procedures of processing effected by the CPU to provide a variable control of the simmer current in the second case of the embodiment.

FIG. 5 illustrates procedures of processing effected by the CPU 38 with the aim of providing a variable control of the simmer current in the second case. In this case as well, the same procedures of processing as in the first case are carried out excepting the procedure for stopping the sequence.

Figure 6:
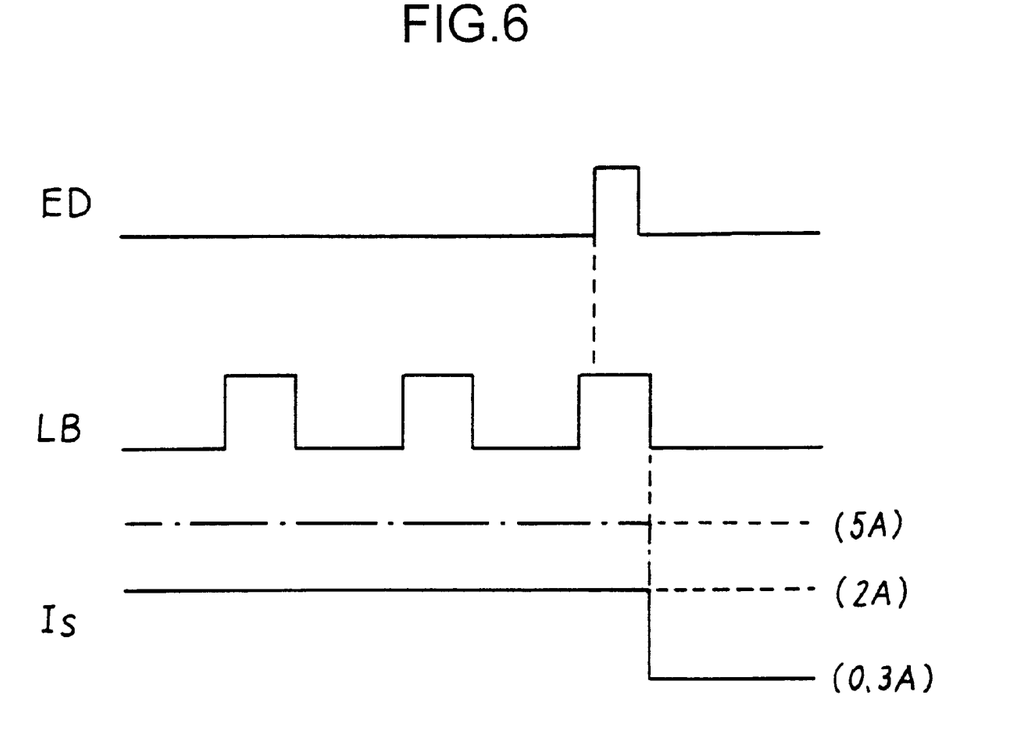
FIG. 6 is a timing chart showing diagrammatically the timing and the waveform of each part in the second case.

In the event of stopping the sequence, a stop signal is fed via the I/F 52 from the external device. When this stop signal is accepted (step $S_9$), the CPU 38 judges whether the pulsed laser beams LB are in oscillatory output at that point of time. If out of oscillatory output, then the CPU 38 stops the sequence at once and returns the current value of the simmer current $I_s$ to its initial value (steps $S_{10}$, $S_{12}$). If in oscillatory output, then the CPU 38 stops the sequence at the time when the oscillatory output of those pulsed laser beams LB has come to an end as shown in FIG. 6, to return the current value of the simmer current $I_s$ to its initial value (steps $S_{11}$, $S_{12}$).

Figure 7:
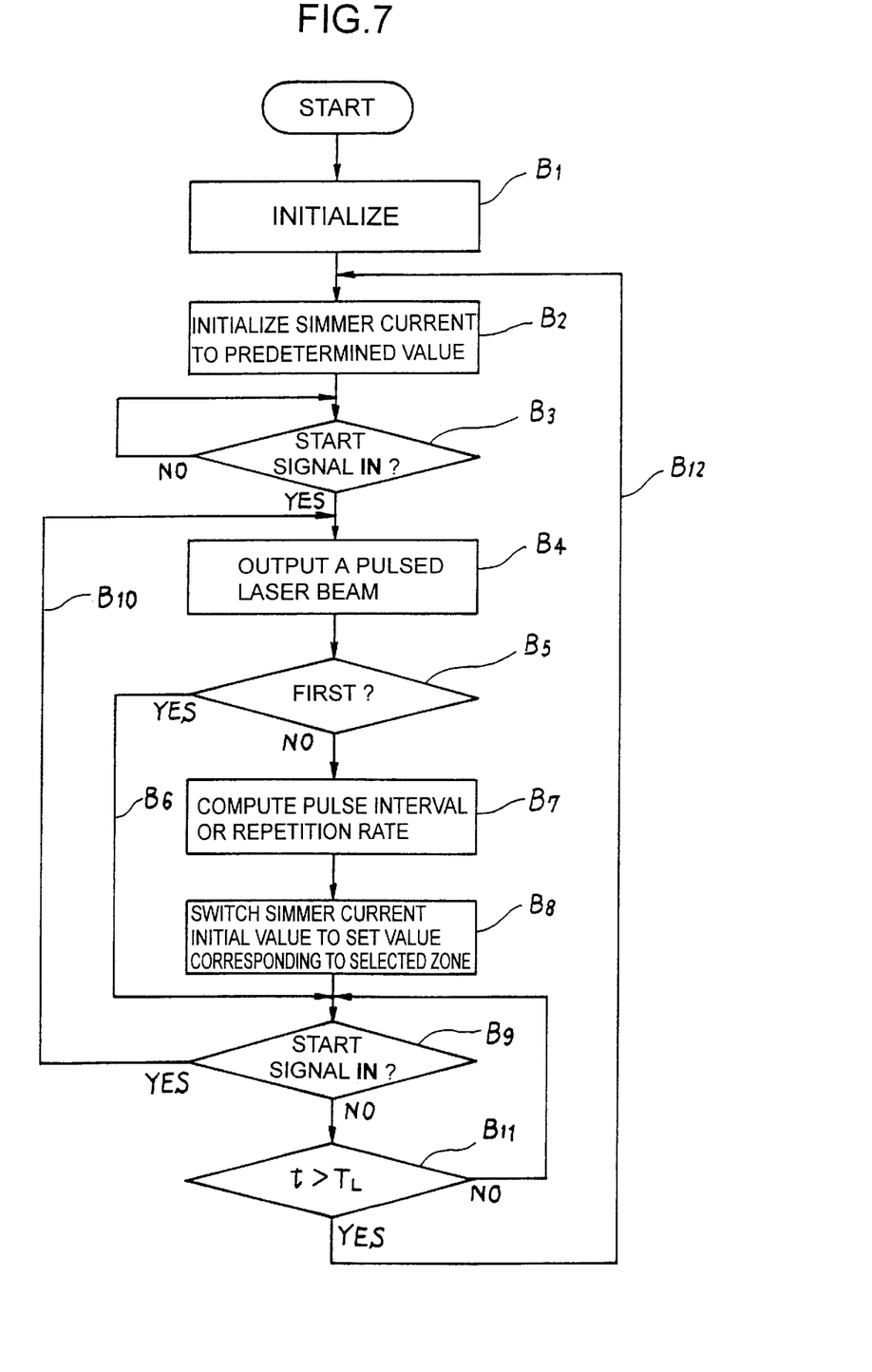
FIG. 7 is a flowchart showing the procedures of processing effected by the CPU to provide a variable control of the simmer current in the third case of the embodiment.
Figure 8:
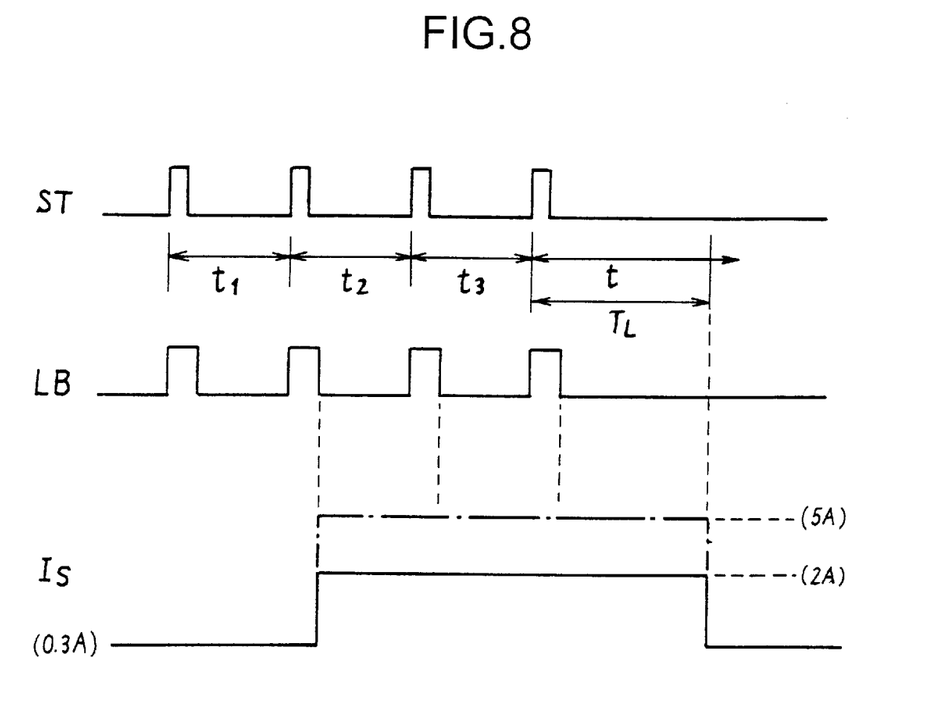
FIG. 8 is a timing chart showing diagrammatically the timing and the waveform of each part in the third case.

FIG. 7 illustrates procedures of processing effected by the CPU 38 with a view to providing a variable control of the simmer current in the third case. FIG. 8 diagrammatically depicts a timing and a waveform at each part in the third case.

In this case as well, similar to the first and second cases, the simmer current $I_s$ is kept at a predetermined initial value during the standby after the power-on or after the reset (steps $B_1$ to $B_2$). In response to the acceptance of an external start signal ST, however, the CPU 38 provides an oscillatory output of a first pulsed laser beam LB with a waveform which has been previously defined in the laser power supply unit 12 and the laser oscillation unit 10 (steps $B_3$, $B_4$).

Since the pulse repetition rate f is uncertain at this point of time, the CPU 38 waits for the next coming external start signal ST (steps $B_6$, $B_9$). Then, when the next external start signal ST is accepted (steps $B_9$, $B_{10}$), the CPU 38 provides an oscillatory output of a second pulsed laser beam LB (step $B_4$) and measures a time difference (time interval) $t_1$ between the first external start signal ST and the second external start signal ST to thereby obtain a pulse repetition rate f ($1/t_1$) from this time difference $t_1$ (step $B_7$). Then the CPU 38 judges the zone associated with the thus obtained pulse repetition rate f and switches the current value of the simmer current $I_s$ to the set value for the associated zone (step $B_8$).

From this onward as well, the CPU 38 iterates the same procedures of processing as the above (steps $B_9 \rightarrow B_{10} \rightarrow B_4 \rightarrow B_5 \rightarrow B_7 \rightarrow B_8 \rightarrow B_9 \rightarrow B_{10} \rightarrow \ldots$) to provide a real-time variable control of the simmer current $I_s$ in response to the timings of the external start signals ST.

Then, when the next external start signal ST has not yet been accepted after the elapse of a predetermined time limit $T_L$ after the acceptance of the most recent external start signal ST, the initial standby mode is restored (steps $B_{11}$, $B_{12}$), allowing the simmer current $I_s$ to return to its initial value (step $B_2$).

Although the pulse repetition rate f (1/t) has been figured out for each time interval of the external start signals ST in this example, the pulse repetition rate f may be found from an average value or a moving average value of a plurality of time intervals.

Although not shown in FIGS. 3, 5 and 7, in the event that the power supply has been disconnected or that any extraordinary situations have taken place, the CPU 38 imparts a control signal instructing on the current-off to the current control circuit 100 of the simmer circuit 18, to cut off the simmer current $I_s$.

In each of the first to third cases described above, actions of the oscillatory output of the pulsed laser beams LB have been made in response to the command signals from the external device. It would also naturally be possible to enter commands corresponding to the above external command signals through the input unit 48 of the apparatus so that the same actions as in the first or second case can typically be carried out.

In the event that all sequence of the iterative laser oscillations or a single laser oscillation has been programmed in the apparatus, it is feasible to previously find the time-sequential transition (variation) of the pulse repetition rate, whereby it is possible to provide a more flexible and accurate variable control of the simmer current than in the above external command method.

If for example the pulse repetition rate f in a series of iterative laser oscillating operation is associated with the "high speed zone", the initial value of the simmer current during the standby period precedent thereto may selectively be the set value (2 A) for "medium speed zone" or the set value (5 A) for "high speed zone" in view of the stability feature in the laser oscillatory outputs. In this context, the initial value of the simmer current could be varied at any time. Such a method allowing a change of the simmer current initial value to, e.g., a relatively high current value at any time could naturally be applied to the above external command system.

Figure 9:
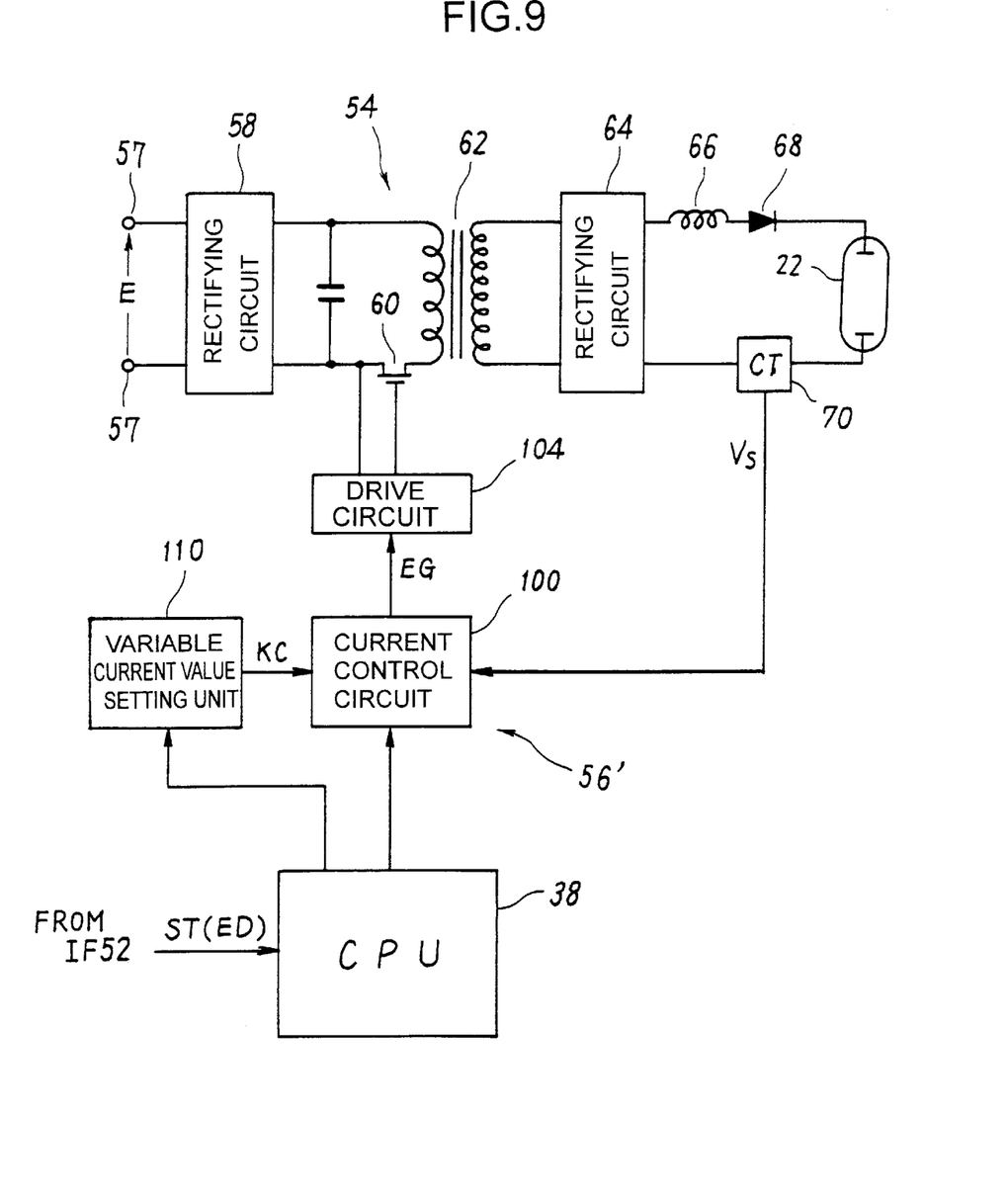
FIG. 9 is a block diagram showing another embodiment of the simmer circuit in accordance with the present invention.

FIG. 9 illustrates another embodiment of the circuit configuration of the simmer circuit 18. This embodiment comprises as shown a control unit 56' which is a variant of the control unit 56 of the first embodiment (see FIG. 2). Arrangement is such that the current control circuit 100 accepts an output signal (current detection signal) $V_s$ directly from the current sensor 70 and simultaneously accepts a variably controllable current set value KC from a variable current value setting unit 110. The current control circuit 100 compares the two inputs ($V_s$, KC) with each other to find a comparison error (difference) and issues a PWM control signal EG allowing the comparison error to approach zero, to thereby provide a switching control of the switching element 60 of the power supply unit 54.

In lieu of providing the on/off control of the switches 84, 86 and 88 to variably control the amplification factor g of the amplifier 82 in the first embodiment described above, the CPU 38 in this embodiment has merely to give an instruction on whether a desired simmer current set value is to be given to the variable current value setting unit 110 at anytime. It is thus possible to provide not only a stepwise variable control but also a continuous variable control.

Nevertheless, the signal processing may become difficult within the current control circuit 100 since the current detection signal $V_s$ from the current sensor 70 is fed directly to the current control circuit 100 without being subjected to any normalization (level calibration) by the amplifier. Hence, in case of the simmer current $I_s$ having a smaller current value, the accuracy in the signal processing or current control may possibly become lower upon the use of the current value (0.3 A) for "low speed zone" for example.

In this respect, the control unit 56 of the first embodiment can ease the burden on the current control circuit 100, with a more accurate current control, in spite of the necessity for the hardware circuits such as the operational amplifiers, resistors and analog switches.

It will be appreciated that the values of various set values (e.g., the numerical values in TABLE 1) in the above embodiments have merely been shown by way of example and that any arbitrary set values could be selected.

The invention is not limited to the embodiment described and shown. Various other modifications can be made within the scope of the invention.

What is claimed is:

1. A laser apparatus having an excitation lamp through which a simmer current flows during the standby period and into which a lamp current of a pulse waveform is fed upon the laser oscillation to cause a pulse lighting of said excitation lamp, whose optical energy excites a solid-state laser medium to provide an oscillatory output of pulsed laser beams, said apparatus comprising:

means for variably controlling the current value of said simmer current in accordance with the repetition rate or the pulse separation of said pulsed laser beams.

2. A laser apparatus having an excitation lamp through which a simmer current flows during the standby period and into which a lamp current of a pulse waveform is fed upon the laser oscillation to cause a pulse lighting of said excitation lamp, whose optical energy excites a solid-state laser medium to provide an oscillatory output of pulsed laser beams, said apparatus comprising:

zone definition means for defining a plurality of zones of the repetition rate or the pulse separation of said pulsed laser beams;

simmer current setting means for separately setting the current value of said simmer current for each of said plurality of zones;

zone judgment means for judging zones associated with said pulsed laser beams output in an oscillatory manner; and simmer current control means for controlling said simmer current to have current values corresponding to associated zones judged by said zone judgment means.

3. The laser apparatus according to claim 2, wherein
said zone judgment means include means for judging said associated zones on the basis of a sequence previously defined for the oscillatory output of said pulsed laser beams.

4. The laser apparatus according to claim 2, wherein
said zone judgment means include:
measurement means for measuring the repetition rate or the pulse separation of said pulsed laser beams oscillatorily output in response to predetermined external signals issued at any arbitrary timings; and
means for judging said associated zones on the basis of measured values acquired by said measurement means.

5. The laser apparatus according to claim 2, wherein
said simmer current control means comprise:
a simmer power supply circuit including a switching element, for the supply of said simmer current to said excitation lamp;
simmer current detection means for detecting said simmer current to issue a voltage signal indicative of the current value thereof;
an amplifier capable of selecting any one of a plurality of amplification factors defined in a corresponding manner for each of said plurality of zones, said amplifier amplifying said voltage signal from said current detection means with selected one of said amplification factors;
amplification factor switching means for switching said amplifier to have said amplification factor corresponding to an associated zone judged by said zone judgment means; and
pulse width control means for comparing an output signal from said amplifier with a previously defined reference current value and for providing a switching control of said switching element by use of switching pulse of a certain frequency having such a pulse width as to allow the comparison error to approach zero.

6. The laser apparatus according to claim 3, wherein
said simmer current control means comprise:
a simmer power supply circuit including a switching element, for the supply of said simmer current to said excitation lamp;
simmer current detection means for detecting said simmer current to issue a voltage signal indicative of the current value thereof;
an amplifier capable of selecting any one of a plurality of amplification factors defined in a corresponding manner for each of said plurality of zones, said amplifier amplifying said voltage signal from said current detection means with selected one of said amplification factors;
amplification factor switching means for switching said amplifier to have said amplification factor corresponding to an associated zone judged by said zone judgment means; and
pulse width control means for comparing an output signal from said amplifier with a previously defined reference current value and for providing a switching control of said switching element by use of switching pulse of a certain frequency having such a pulse width as to allow the comparison error to approach zero.

7. The laser apparatus according to claim 4, wherein
said simmer current control means comprise:
a simmer power supply circuit including a switching element, for the supply of said simmer current to said excitation lamp;
simmer current detection means for detecting said simmer current to issue a voltage signal indicative of the current value thereof;
an amplifier capable of selecting any one of a plurality of amplification factors defined in a corresponding manner for each of said plurality of zones, said amplifier amplifying said voltage signal from said current detection means with selected one of said amplification factors;
amplification factor switching means for switching said amplifier to have said amplification factor corresponding to an associated zone judged by said zone judgment means; and
pulse width control means for comparing an output signal from said amplifier with a previously defined reference current value and for providing a switching control of said switching element by use of switching pulse of a certain frequency having such a pulse width as to allow the comparison error to approach zero.

8. The laser apparatus according to claim 1, further comprising:
means for keeping said simmer current at a desired set value during the period when no oscillatory output is made of a series of said pulsed laser beams.

9. The laser apparatus according to claim 2, further comprising:
means for keeping said simmer current at a desired set value during the period when no oscillatory output is made of a series of said pulsed laser beams.

10. The laser apparatus according to claim 3, further comprising:
means for keeping said simmer current at a desired set value during the period when no oscillatory output is made of a series of said pulsed laser beams.

11. The laser apparatus according to claim 4, further comprising:
means for keeping said simmer current at a desired set value during the period when no oscillatory output is made of a series of said pulsed laser beams.

12. The laser apparatus according to claim 5, further comprising:
means for keeping said simmer current at a desired set value during the period when no oscillatory output is made of a series of said pulsed laser beams.

13. The laser apparatus according to claim 6, further comprising:
means for keeping said simmer current at a desired set value during the period when no oscillatory output is made of a series of said pulsed laser beams.

14. The laser apparatus according to claim 7, further comprising:
means for keeping said simmer current at a desired set value during the period when no oscillatory output is made of a series of said pulsed laser beams.

* * * * *